US007437568B2

(12) United States Patent
Das-Purkayastha et al.

(10) Patent No.: US 7,437,568 B2

(45) Date of Patent: Oct. 14, 2008

(54) APPARATUS AND METHOD FOR ESTABLISHING TRUST

(75) Inventors: Arindam Das-Purkayastha, Bristol (GB); Siani Lynne Pearson, Bristol (GB); Liqun Chen, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1456 days.

(21) Appl. No.: 09/931,526

(22) Filed: Aug. 16, 2001

(65) Prior Publication Data

US 2002/0026576 A1 Feb. 28, 2002

(30) Foreign Application Priority Data

Aug. 18, 2000 (GB) ................................ 0020371.1

(51) Int. Cl.

*G06F 11/30* (2006.01)
*G06F 12/14* (2006.01)
*H04L 9/32* (2006.01)
*H04L 9/00* (2006.01)

(52) U.S. Cl. ....................... 713/187; 713/164; 713/165; 713/166; 713/167; 713/168; 713/188; 713/189; 726/21; 726/22; 726/23; 726/24; 726/25; 380/277; 380/278; 380/279; 380/280; 380/285

(58) Field of Classification Search ................... 380/30, 380/277–285; 713/200–201, 187–189, 161, 713/164–176, 193–194; 707/9; 726/28–30, 726/21–26

See application file for complete search history.

(56) References Cited

U.S. PATENT DOCUMENTS

| | | | | |
|---|---|---|---|---|
| 5,421,006 | A | 5/1995 | Jablon et al. | 395/575 |
| 5,537,540 | A | 7/1996 | Miller et al. | 395/183.14 |
| 5,919,257 | A * | 7/1999 | Trostle | 713/200 |
| 6,009,177 | A * | 12/1999 | Sudia | 713/191 |
| 6,009,524 | A | 12/1999 | Olarig et al. | 713/200 |
| 6,209,099 | B1 * | 3/2001 | Saunders | 713/200 |
| 6,415,280 | B1 * | 7/2002 | Farber et al. | 707/2 |
| 6,430,561 | B1 * | 8/2002 | Austel et al. | 707/9 |
| 6,615,264 | B1 * | 9/2003 | Stoltz et al. | 709/227 |
| 6,678,833 | B1 * | 1/2004 | Grawrock | 713/401 |

FOREIGN PATENT DOCUMENTS

| | | |
|---|---|---|
| DE | 43 15 732 C1 | 6/1994 |
| EP | 0 417 889 A2 | 3/1991 |
| EP | 0 828 209 A2 | 3/1998 |
| EP | 1 030 237 A1 | 8/2000 |
| WO | 00/48063 | 8/2000 |

OTHER PUBLICATIONS

ISO/IEC 15408 Common Criteria for Information Technology Security Evaluation, Aug. 1999.*

"Common Criteria for Information Technology Secure Evaluation" Aug. 1999 Version 2.1 (CCIMB-99-031).*

ISO/IEC 9798-3, "Information technology—Security techniques—Entity authentication mechanisms; Part 3; Entity authentication using a public key algorithm," International Organization for Standardization, Geneva, Switzerland, pp. 1-9 (1993).

* cited by examiner

*Primary Examiner*—Longbit Chai

(57) ABSTRACT

Computer apparatus comprising a receiver for receiving an integrity metric for a computer entity via a trusted device associated with the computer entity, the integrity metric having values for a plurality of characteristics associated with the computer entity; a controller for assigning a trust level to the computer entity from a plurality of trust levels, wherein the assigned trust level is based upon the value of at least one of the characteristics of the received integrity metric.

37 Claims, 7 Drawing Sheets

APPARATUS AND METHOD FOR ESTABLISHING TRUST

TECHNICAL FIELD

The present invention relates to the determining of trust levels for a computer entity.

BACKGROUND ART

A modern computing apparatus includes many different components, otherwise known as entities, (the word "component" and "entity" is used here to describe essentially any discrete functional element of a computing platform, including either a piece of hardware, a piece of software or a piece of firmware), most of which are standardized and can be upgraded. Alternatively, the use of computer entity can refer to a computer platform comprising a plurality of components.

EP patent application 99301100.6 describes the use of a Trusted Component ('TC'), also known as a trusted device (TD), to enable verification of the integrity of computing apparatus by the reliable measurement and reliable reporting of integrity metrics. This enables the verification of the integrity of computer apparatus by either a local user or a remote entity. EP patent application 99301100.6 describes a general method of reporting integrity metrics and verifying the correctness of the integrity of computing apparatus by comparing reported values of metrics with verified values of metrics. This solution allows an apparatus' challenger (where a challenger is defined as a local or remote device possibly operating on behalf of a human user) to challenge the trusted device in order to check the integrity of one or more particular component. The trusted device responds to the challenge by sending a signed report of the one or more particular components. The report includes information about the components, such as the model of a component, the manufacturer of a component, the version of a component, upgraded data and so on. After receiving the report, the challenger makes a decision on whether or not to trust a particular component, and furthermore after checking a number of selected functional components, the challenger will make a decision whether or nor to trust the computing apparatus.

One useful feature, which has not been covered by this prior art solution, is how the challenger of the computing apparatus is able to make its own decision easily and how those decisions can be dealt with in a flexible manner.

It is desirable to improve this situation.

SUMMARY OF THE INVENTION

In accordance with a first aspect of the present invention there is provided a computer apparatus comprising a receiver for receiving an integrity metric for a computer entity via a trusted device associated with the computer entity, the integrity metric having values for a plurality of characteristics associated with the computer entity; a controller for assigning a trust level to the computer entity from a plurality of trust levels, wherein the assigned trust level is based upon the value of at least one of the characteristics of the received integrity metric.

Preferably the trusted device is arranged to acquire an integrity metric of the computer entity.

Preferably the trust level is determined by comparing the value of the at least one characteristics with a specified value.

Preferably the plurality of trust levels are determined base upon a plurality of specified values associated with a plurality of characteristics of a computer entity.

Preferably the plurality of trust levels are determined based upon a plurality of specified values associated with characteristics for a plurality of computer entities.

In accordance with a second aspect of the present invention there is provided a method of assigning a trust level, the method comprising receiving an integrity metric for a computer entity via a trusted device associated with the computer entity, the integrity metric having values for a plurality of characteristics associated with the computer entity; assigning a trust level to the computer entity from a plurality of trust levels, wherein the assigned trust level is based upon the value of at least one of the characteristics of the received integrity metric.

This invention extends the prior art solution of integrity checking of selected components within the computing apparatus, and allows the user to implement its own policy related to integrity checking.

The recording of all or some of the related information of a functional component of a computing apparatus can be performed efficiently and completely. The information stored can include a full history of the component as well as the component's current value.

A policy database can be established by listing the configuration of functional components and related information.

The policy list can be stored in a secure manner, if required. For example, by storing the policy specific parameters using either a trusted token or other computing apparatus of the user or the protected storage of the computing apparatus.

This invention relates to the integrity checking of functional components in a computing apparatus and how this measurement can be used by a user in establishing trustworthiness of a computing apparatus based on the policy established by the user of the apparatus.

The method proposed in this invention allows the user of a computing apparatus, both remote and local, to establish trust on the apparatus before exchanging data.

BRIEF DESCRIPTION OF THE DRAWINGS

Preferred embodiments of the present invention will now be described, by way of example only, with reference to the accompanying drawings, of which.

DESCRIPTION OF THE PREFERRED EMBODIMENT

As described in detail below, a trusted platform has as its central feature the incorporation into a computing platform of a physical trusted device whose function is to bind the identity of the platform to reliably measured data that provides an integrity metric of the platform. The identity and the integrity metric are compared with expected values provided by a trusted party (TP) that is prepared to vouch for the trustworthiness of the platform. If there is a match, the implication is that at least part of the platform is operating correctly, depending on the scope of the integrity metric.

A user verifies the correct operation of the platform before exchanging other data with the platform. A user does this by requesting the trusted device to provide its identity and an integrity metric. The identity metric of the platform as a whole can be obtained by obtaining the identity metric of the individual critical components of the platform from their respective component configuration registers (CCRs). (Optionally the trusted device will refuse to provide evidence of identity if it itself was unable to verify correct operation of the components of the platform.) The user receives the proof of identity and the identity metrics of the individual components, and compares them against values that it believes to be true. Those proper values are provided by the TP or another entity that is trusted by the user or can be set by the user himself. By interpreting the component configuration values (CCV) associated with the CCRs, and comparing these values with the standard set in his policy, the user determines what level of trust to attach with that platform, as described below. The user believes the data reported by the trusted device (TC) because it has validated its identity.

Once a user has established a level of trust with the operation of the platform, he exchanges other data with the platform or decides not to exchange data with that platform. For a local user, the exchange might be by interacting with some software application running on the platform. For a remote user, the exchange might involve a secure transaction. In either case, the data exchanged is 'signed' by the trusted device. The user can then have greater confidence that data is being exchanged with a platform whose behaviour can be trusted.

Figure 1:
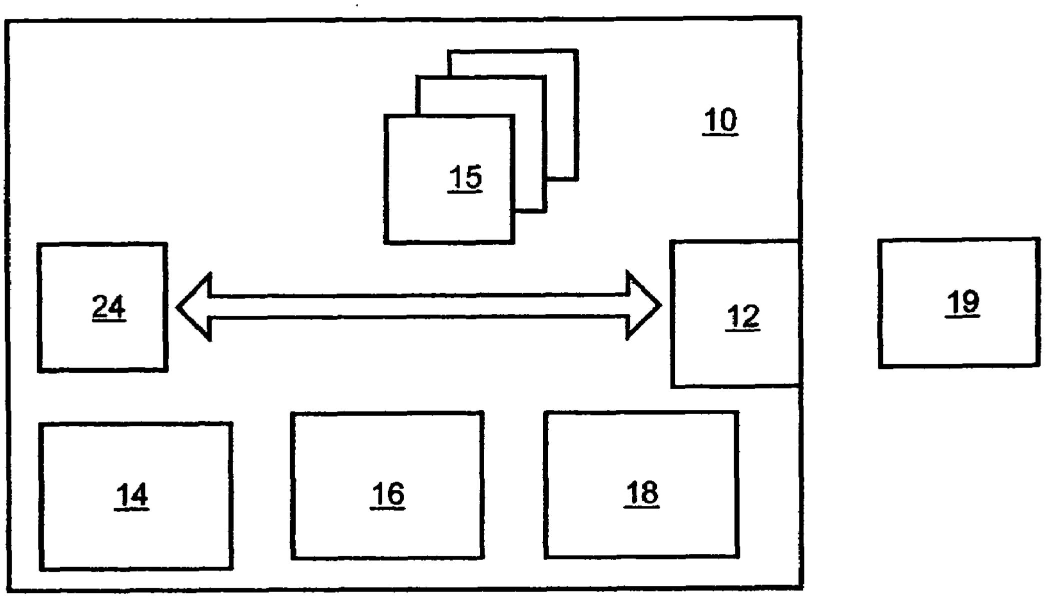
FIG. 1 is a diagram that illustrates a system capable of implementing embodiments of the present invention.
Figure 2:
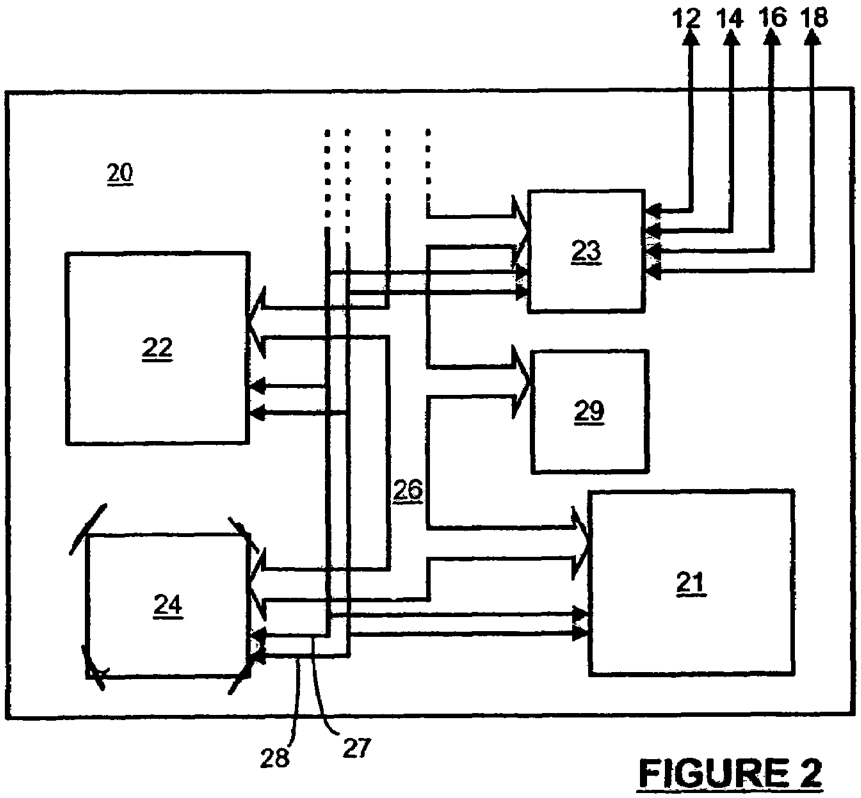
FIG. 2 is a diagram, which illustrates a motherboard including a trusted device arranged to communicate with a smart card via a smart card reader and with a group of functional components.

A trusted platform 10 is illustrated in the diagram in FIG. 1. The platform 10 includes the standard features of a keyboard 14, mouse 16 and visual display unit (VDU) 18, which provide the physical 'user interface' of the platform. This embodiment of a trusted platform also contains a smart card reader 12—a smart card reader is not an essential element of all trusted platforms, but is employed in various preferred embodiments described below. Alongside the smart card reader 12, there is illustrated a smart card 19 to allow trusted user interaction with the trusted platform as shall be described further below. In the platform 10, there are a plurality of modules 15: these are other functional elements of the trusted platform of essentially any kind appropriate to that platform. Optionally, instead of a smart card and reader, any type of mobile computing apparatus (for example, a Personal Digital Assistant) can be used to connect to the trusted platform and operate on the user's behalf as a device that can challenge the trusted platform, perform computation regarding the trustworthiness of the computing platform, feed information as to the trustworthiness of the computing platform to the user or store user profiles. As illustrated in FIG. 2, the motherboard 20 of the trusted computing platform 10 includes (among other standard components) a main processor 21, main memory 22, a trusted device 24, a data bus 26 and respective control lines 27 and lines 28, BIOS memory 29 containing the BIOS program for the platform 10 and an Input/Output (IO) device 23, which controls interaction between the components of the motherboard and the smart card reader 12, the keyboard 14, the mouse 16 and the VDU 18. The main memory 22 is typically random access memory (RAM). In operation, the platform 10 loads the operating system, for example Windows NT™, into RAM from hard disk (not shown). Additionally, in operation, the platform 10 loads the processes or applications that may be executed by the platform 10 into RAM from hard disk (not shown).

The trusted device uses cryptographic processes but does not necessarily provide an external interface to those cryptographic processes. Also, a most desirable implementation would be to make the trusted device tamperproof, to protect secrets by making them inaccessible to other platform functions and provide an environment that is substantially immune to unauthorised modification. Since tamper proofing is impossible, the best approximation is a trusted device that is tamper-resistant, or tamper-detecting. The trusted device, therefore, preferably consists of one physical component that is tamper-resistant. Techniques relevant to tamper-resistance are well known to those skilled in the art of security.

The trusted device is preferably a physical one because it must be difficult to forge. It is most preferably tamper-resistant because it must be hard to counterfeit. It typically has an engine capable of using cryptographic processes because it is required to prove identity, both locally and at a distance, and it contains at least one method of measuring some integrity metric of the platform with which it is associated.

Typically, in a personal computer the BIOS program is located in a special reserved memory area, the upper 64K of the first megabyte do the system memory (addresses FØØØh to FFFFh), and the main processor is arranged to look at this memory location first, in accordance with an industry wide standard.

The significant difference between the platform and a conventional platform is that, after reset, the main processor is initially controlled by the trusted device, which then hands control over to the platform-specific BIOS program, which in turn initialises all input/output devices as normal. After the BIOS program has executed, control is handed over as normal by the BIOS program to an operating system program, such as Windows NT™, which is typically loaded into main memory 22 from a hard disk drive (not shown).

Clearly, this change from the normal procedure requires a modification to the implementation of the industry standard, whereby the main processor 21 is directed to address the trusted device 24 to receive its first instructions. This change may be made simply by hard-coding a different address into the main processor 21. Alternatively, the trusted device 24 may be assigned the standard BIOS program address, in which case there is no need to modify the main processor configuration.

It is highly desirable for the BIOS boot block to be contained within the trusted device 24. This prevents subversion of the obtaining of the integrity metric (which could otherwise occur if rogue software processes are present) and prevents rogue software processes creating a situation in which the BIOS (even if correct) fails to build the proper environment for the operating system.

Although, in the preferred embodiment to be described, the trusted device 24 is a single, discrete component, it is envisaged that the functions of the trusted device 24 may alternatively be split into multiple devices on the motherboard, or even integrated into one or more of the existing standard devices of the platform. For example, it is feasible to integrate one or more of the functions of the trusted device into the main processor itself, provided that the functions and their communications cannot be subverted. This, however, would probably require separate leads on the processor for sole use by the trusted functions. Additionally or alternatively, although in the present embodiment the trusted device is a hardware device that is adapted for integration into the motherboard 20, it is anticipated that a trusted device may be implemented as a 'removable' device, such as a dongle, which could be attached to a platform when required. Whether the trusted device is integrated or removable is a matter of design choice. However, where the trusted device is separable, a mechanism for providing a logical binding between the trusted device and the platform should be present.

Figure 3:
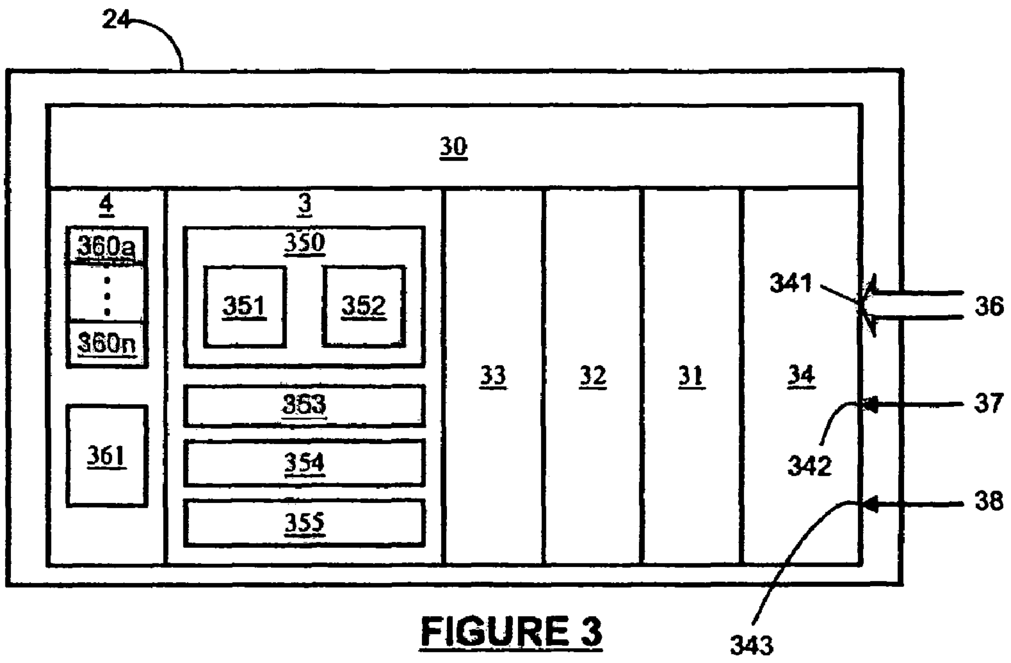
FIG. 3 is a diagram that illustrates the trusted device in more detail.

The trusted device 24 comprises a number of blocks, as illustrated in FIG. 3. After system reset, the trusted device 24 performs a secure boot process to ensure that the operating system of the platform 10 (including the system clock and the display on the monitor) is running properly and in a secure manner. During the secure boot process, the trusted device 24 acquires an integrity metric of the computing platform 10. The trusted device 24 can also perform secure data transfer and, for example, authentication between it and a smart card via encryption/decryption and signature/verification. The trusted device 24 can also securely enforce various security control policies, such as locking of the user interface.

Specifically, the trusted device comprises: a controller 30 programmed to control the overall operation of the trusted device 24, and interact with the other functions on the trusted device 24 and with the other devices on the motherboard 20; a measurement function 31 for acquiring the integrity metric from the platform 10; a cryptographic function 32 for signing, encrypting or decrypting specified data; an authentication function 33 for authenticating a smart card; and interface circuitry 34 having appropriate ports (36, 37 & 38) for connecting the trusted device 24 respectively to the data bus 26, control lines 27 and address lines 28 of the motherboard 20. Each of the blocks in the trusted device 24 has access (typically via the controller 30) to appropriate volatile memory areas 4 and/or non-volatile memory areas 3 of the trusted device 24. Additionally, the trusted device 24 is designed, in a known manner, to be tamper resistant.

For reasons of performance, the trusted device 24 may be implemented as an application specific integrated circuit (ASIC). However, for flexibility, the trusted device 24 is preferably an appropriately programmed micro-controller. Both ASICs and micro-controllers are well known in the art of microelectronics and will not be considered herein in any further detail.

One item of data stored in the non-volatile memory 3 of the trusted device 24 is a certificate 350. The certificate 350 contains at least a public key 351 of the trusted device 24 and an authenticated value 352 of the platform integrity metric measured by a trusted party (TP). The certificate 350 is signed by the TP using the TP's private key prior to it being stored in the trusted device 24. In later communications sessions, a user of the platform 10 can verify the integrity of the platform 10 by comparing the acquired integrity metric with the authentic integrity metric 352. If there is a match, the user can be confident that the platform 10 has not been subverted. Knowledge of the TP's generally-available public key enables simple verification of the certificate 350. The non-volatile memory 35 also contains an identity (ID) label 353. The ID label 353 is a conventional ID label, for example a serial number, that is unique within some context. The ID label 353 is generally used for indexing and labelling of data relevant to the trusted device 24, but is insufficient in itself to prove the identity of the platform 10 under trusted conditions.

The trusted device 24 is equipped with at least one method of reliably measuring or acquiring the integrity metric of the computing platform components 10. In the present embodiment, the integrity metric is acquired by the measurement function 31 by generating a digest of the BIOS instructions in the BIOS memory. Such an acquired integrity metric, if verified as described above, gives a potential user of the platform 10 a high level of confidence that the platform 10 has not been subverted at a hardware, or BIOS program, level. Other known processes, for example virus checkers, will typically be in place to check that the operating system and application program code has not been subverted.

The measurement function 31 has access to: non-volatile memory 3 for storing a hash program 354 and a private key 355 of the trusted device 24, and volatile memory 4 for storing acquired integrity metric in the form of a digest 361. The integrity values of individual components of the computing apparatus are stored in a Component Configuration Register (CCR). Each single component of the apparatus will have a CCR with its integrity values: Component Configuration Values (CCV). The CCV will include the current configuration details of the component and also the previously modified values of the component. Thus the CCR records the complete history of a component, however storing the complete history of a component is not a necessity. Storing the history enables a user to check the current information of a component and also the past record of the component before it decides about the trustworthiness of that component. The number of CCRs in a computing apparatus is optional. Theoretically a computing apparatus will have as many CCRs as there are components in the apparatus. Also, theoretically, different CCRs in a computing appliance will have different sizes. But from the point of simplicity and efficiency, it is best to keep the size of CCRs in a computing appliance the same.

Any computing apparatus should have a minimum number of CCRs to hold information about the critical components. There is, as has been stated earlier, no upper limit of CCRs in a computing apparatus.

Preferably a CCR is available for each of the following components:

1. BIOS
2. Optional ROM
3. OS Loader
4. Operating System

So preferably there are at least four CCRs, one for each of the above components, in any computing apparatus.

Figure 6:
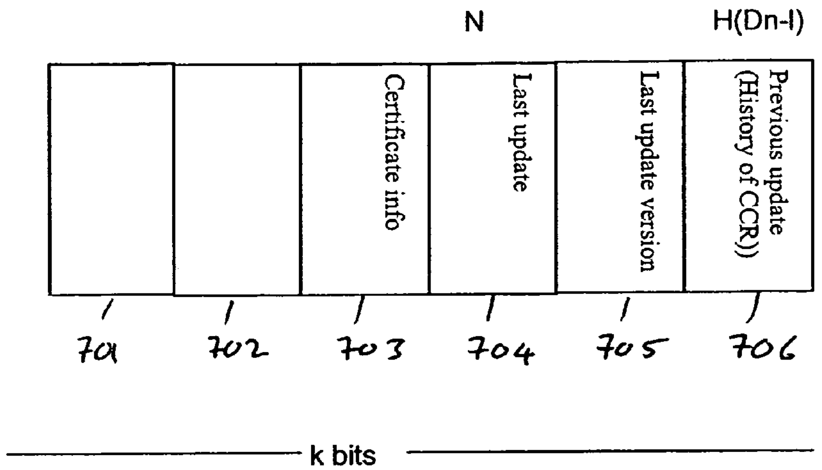
FIG. 6 is an illustration of the structure of various fields in a CCR component.

FIG. 6 shows an example of the fields of a CCR, where the fields in a CCR together form the Component Configuration value (CCV). Additional fields can be optionally added, if required. The fields are:

701 CCR Contents (e.g. BIOS, OS, OS Loader etc.)
702 CCR index
703 Certificate information
704 Last update (this can be a pre-specified value, say 0 for reset, 1 for Boot etc.)
705 Latest update version
706 Previous update The CCR Content 701 can be used to mention the name of the software/hardware component of the platform about which the CCR stores information.

The CCR index 702 gives the index number of the CCR

For simplicity purposes, the CCR index 702 and CCR content 701 can be standardized. That means, a particular index number will always identify a particular component. In that case it is advisable to keep the CCR index 702 as a mandatory field. Again this is not mandatory while implementing but just a suggestion for simplification. Users can choose to carry out this implementation differently.

An example of the above mentioned idea is:

CCR index 1 will refer to BIOS information

CCR index 2 will always refer to Optional ROM.

Every component of the platform can have its own certificate for the purpose of authenticity. The certificate field 703 in the CCR register will hold information of the certificate of that component.

The last update 704 of that CCR can be a predetermined update indicator such as 0,1 . . . etc. For example—0 for update by reset and 1 for update by boot.

The latest update version field 705 can contain a hash of the latest updated version/information of the software/hardware component.

The previous update field 706 stores information about all previous information that were stored in the CCR, before the latest CCR value was loaded. This field acts as the history of the CCR.

The idea is to allow the user to look at the history of the components, which in other words means the history of the platform, before determining whether that particular component can be trusted or not; and if to be trusted, to what degree.

For example, a particular CCR might have been updated 50 times but the security policy might require checking only the last 15 update values for making a trust-related decision. The history is stored in such a flexible and efficient way that the user can extract any number of previous CCV values (history).

To provide a minimum level of information about a particular component, typically the following fields will in a CCR:

1. CCR contents or CCR index
2. Last update version

The above fields allows a user to associate a CCR to its respective component and also provides the present value of the CCR.

Figure 7:
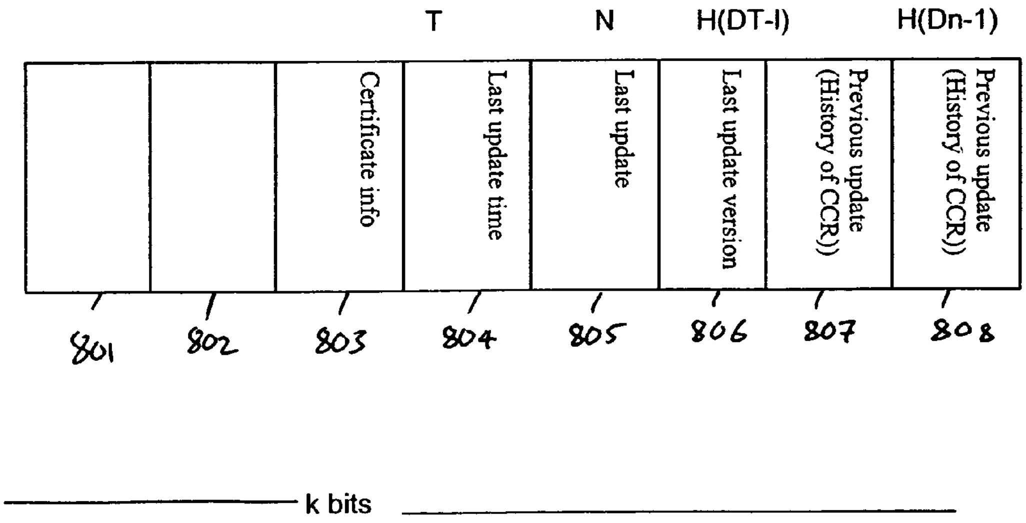
FIG. 7 is an illustration of CCR fields with time-related information about components

FIG. 7 illustrates an alternative structure of a CCR which stores component information in relation to time. For example, a user's policy might require to obtain all information about a particular component over the last 24 hours.

For this purpose, in addition to storing CCR values with respect to every update event, there should be a mechanism to store CCR values with respect to a time frame (t).

In that case the CCR fields will be:

801 CCR index

802 CCR Contents (eg. BIOS, OS, OS Loader etc.)

803 Certificate

804 Last update N

805 Last update time H(t)

806 Latest update version

807 Previous update (History) with respect to update

808 Previous update (History) with respect to time

In appropriate embodiments, the volatile memory 4 may also be used to store the public keys and associated ID labels 360*a*-360*n* of one or more authentic smart cards 19*s* that can be used to gain access to the platform 10.

In one preferred implementation, as well as the digest, the integrity metric includes a Boolean value, which is stored in volatile memory 4 by the measurement function 31, for reasons that will become apparent.

Figure 4:
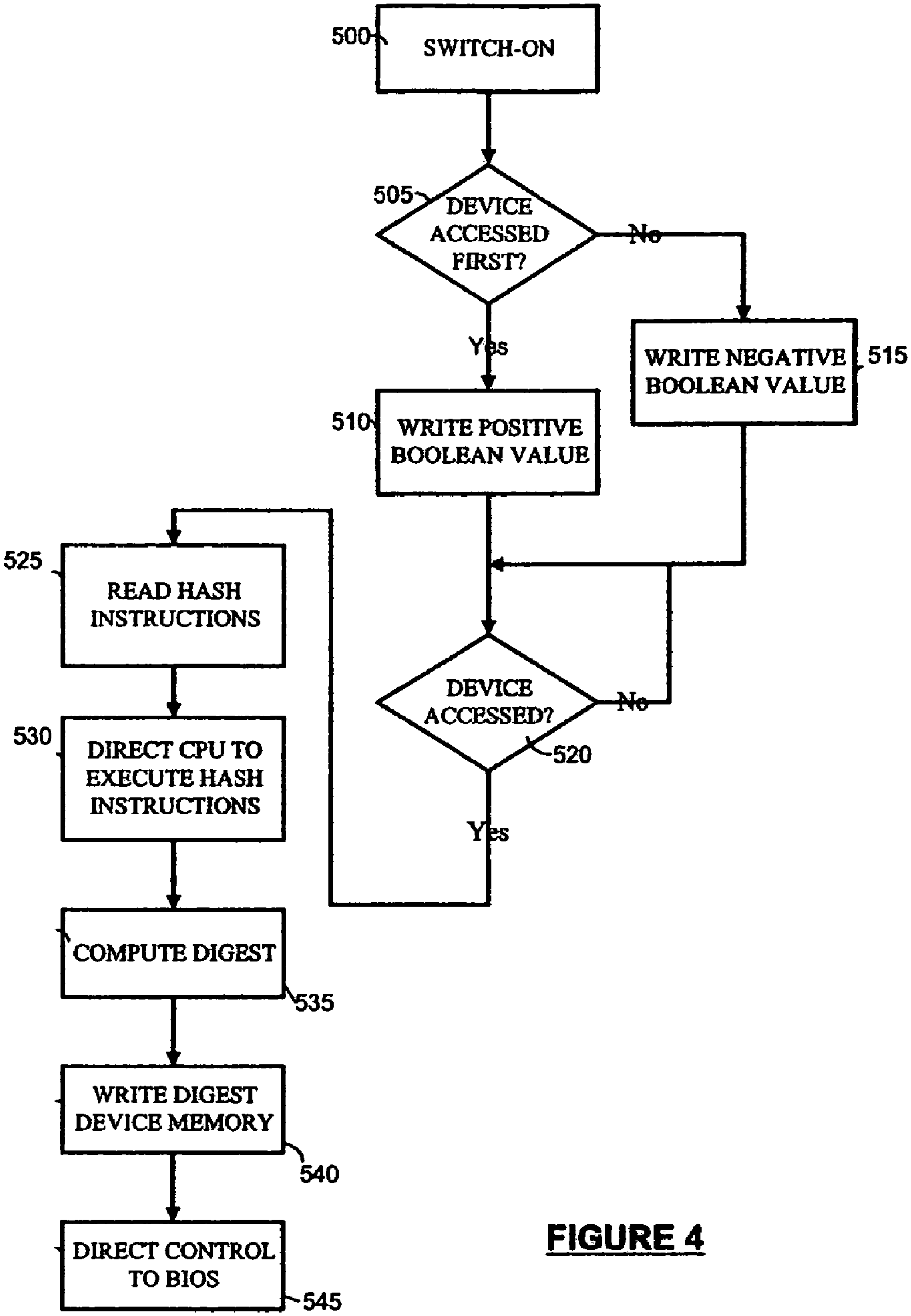
FIG. 4 is a flow diagram that illustrates the steps involved in acquiring an integrity metric of the computing apparatus.

A preferred process for acquiring an integrity metric will now be described with reference to FIG. 4.

In step 500, at switch-on, the measurement function 31 monitors the activity of the main processor 21 on the data, control and address lines (26, 27 & 28) to determine whether the trusted device 24 is the first memory accessed. Under conventional operation, a main processor would first be directed to the BIOS memory in order to execute the BIOS program. However, in accordance with the present embodiment, the main processor 21 is directed to the trusted device 24, which acts as a memory. In step 505, if the trusted device 24 is the first memory accessed, in step 510, the measurement function 31 writes to volatile memory 3 a Boolean value which indicates that the trusted device 24 was the first memory accessed. Otherwise, in step 515, the measurement function writes a Boolean value which indicates that the trusted device 24 was not the first memory accessed.

In the event the trusted device 24 is not the first accessed, there is of course a chance that the trusted device 24 will not be accessed at all. This would be the case, for example, if the main processor 21 were manipulated to run the BIOS program first. Under these circumstances, the platform would operate, but would be unable to verify its integrity on demand, since the integrity metric would not be available. Further, if the trusted device 24 were accessed after the BIOS program had been accessed, the Boolean value would clearly indicate lack of integrity of the platform.

In step 520, when (or if) accessed as a memory by the main processor 21, the main processor 21 reads the stored native hash instructions 354 from the measurement function 31 in step 525. The hash instructions 354 are passed for processing by the main processor 21 over the data bus 26. In step 530, main processor 21 executes the hash instructions 354 and uses them, in step 535, to compute a digest of the BIOS memory 29, by reading the contents of the BIOS memory 29 and processing those contents according to the hash program. In step 540, the main processor 21 writes the computed digest 361 to the appropriate non-volatile memory location 4 in the trusted device 24. The measurement function 31, in step 545, then calls the BIOS program in the BIOS memory 29, and execution continues in a conventional manner.

Clearly, there are a number of different ways in which the integrity metric may be calculated, depending upon the scope of the trust required. The measurement of the BIOS program's integrity provides a fundamental check on the integrity of a platform's underlying processing environment. The integrity metric should be of such a form that it will enable reasoning about the validity of the boot process—the value of the integrity metric can be used to verify whether the platform booted using the correct BIOS. Optionally, individual functional blocks within the BIOS could have their own digest values, with an ensemble BIOS digest being a digest of these individual digests. This enables a policy to state which parts of BIOS operation are critical for an intended purpose, and which are irrelevant (in which case the individual digests must be stored in such a manner that validity of operation under the policy can be established).

Other integrity checks could involve establishing that various other devices, components or apparatus attached to the platform are present and in correct working order. In one example, the BIOS programs associated with a SCSI controller could be verified to ensure communications with peripheral equipment could be trusted.

In another example, the integrity of other devices, for example memory devices or co-processors, on the platform could be verified by enacting fixed challenge/response interactions to ensure consistent results. Where the trusted device 24 is a separable component, some such form of interaction is desirable to provide an appropriate logical binding between the trusted device 14 and the platform. Also, although in the present embodiment the trusted device 24 utilises the data bus as its main means of communication with other parts of the platform, it would be feasible, although not so convenient, to provide alternative communications paths, such as hard-wired paths or optical paths. Further, although in the present embodiment the trusted device 24 instructs the main processor 21 to calculate the integrity metric in other embodiments, the trusted device itself is arranged to measure one or more integrity metrics.

Preferably, the BIOS boot process includes mechanisms to verify the integrity of the boot process itself. Such mechanisms are already known from, for example, Intel's draft "Wired for Management baseline specification v 2.0—BOOT Integrity Service", and involve calculating digests of software or firmware before loading that software or firmware. Such a computed digest is compared with a value stored in a certificate provided by a trusted entity, whose public key is known to the BIOS. The software/firmware is then loaded only if the computed value matches the expected value from the certificate, and the certificate has been proven valid by use of the trusted entity's public key. Otherwise, an appropriate exception handling routine is invoked.

Optionally, after receiving the computed BIOS digest, the trusted device 24 may inspect the proper value of the BIOS digest in the certificate and not pass control to the BIOS if the computed digest does not match the proper value. Additionally, or alternatively, the trusted device 24 may inspect the Boolean value and not pass control back to the BIOS if the trusted device 24 was not the first memory accessed. In either of these cases, an appropriate exception handling routine may be invoked.

Figure 5:
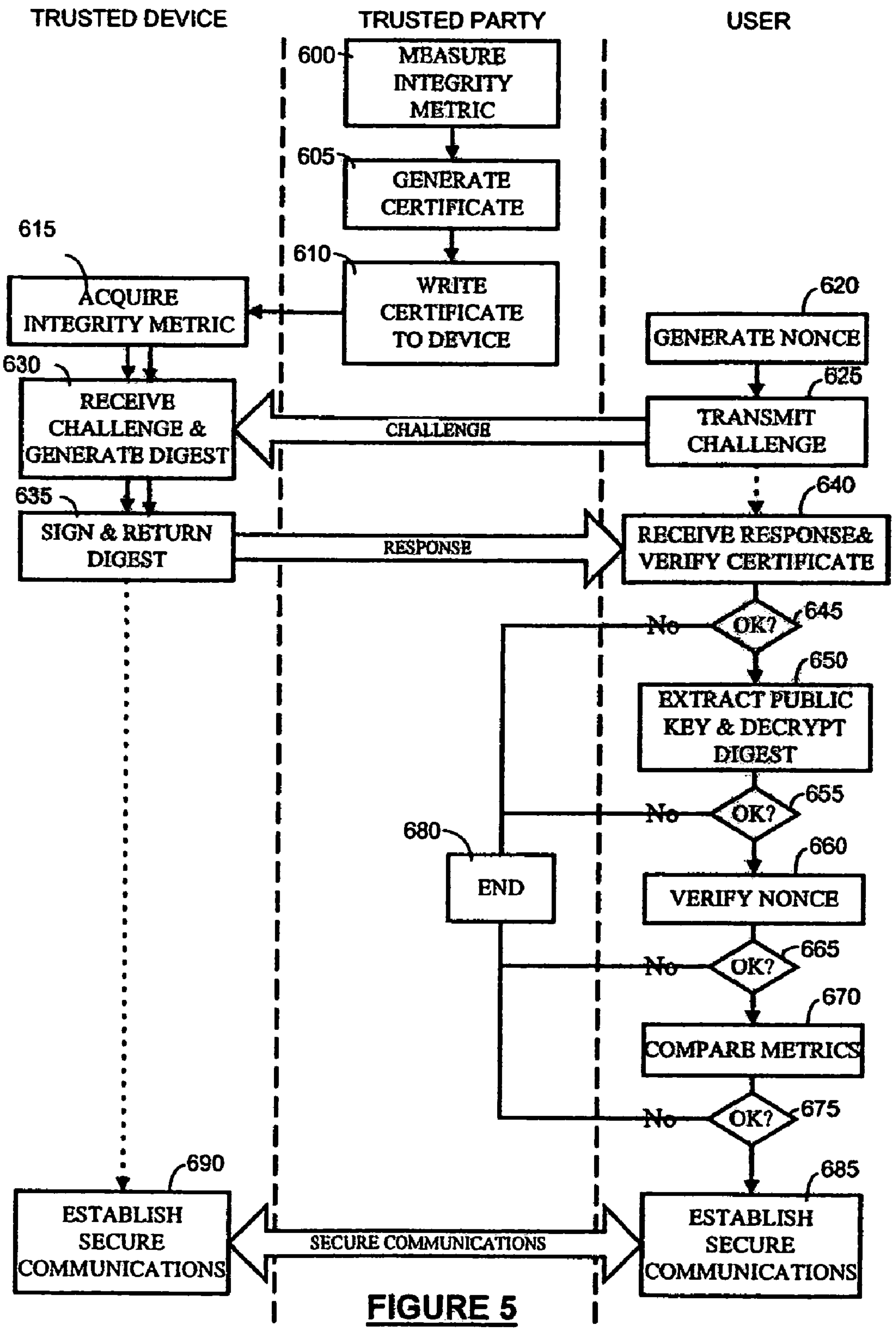
FIG. 5 is a flow diagram that illustrates the steps involved in establishing communications between a trusted computing platform and a remote platform including the trusted platform verifying its integrity.

FIG. 5 illustrates the flow of actions by a TP, the trusted device 24 incorporated into a platform, and a user (of a remote platform) who wants to verify the integrity of the trusted platform. It will be appreciated that substantially the same steps as are depicted in FIG. 5 are involved when the user is a local user. In either case, the user would typically rely on some form of software application to enact the verification. It would be possible to run the software application on the remote platform or the trusted platform. However, there is a chance that, even on the remote platform, the software application could be subverted in some way. Therefore, it is anticipated that, for a high level of integrity, the software application would reside on a smart card (or other trusted portable computing device or token) of the user, who would insert the smart card into an appropriate reader for the purposes of verification. FIG. 5 illustrates the flow of actions for the general case—a more specific flow of actions for verification by a user smart card will be described with reference to FIG. 6 further below.

At the first instance, a TP, which vouches for trusted platforms, will inspect the type of the platform to decide whether to vouch for it or not. This will be a matter of policy. If all is well, in step 600, the TP measures the value of integrity metric of the platform. Then, the TP generates a certificate, in step 605, for the platform. The certificate is generated by the TP by appending the trusted device's public key, and optionally its ID label, to the measured integrity metric, and signing the string with the TP's private key.

The trusted device 24 can subsequently prove its identity by using its private key to process some input data received from the user and produce output data, such that the input/output pair is statistically impossible to produce without knowledge of the private key. Hence, knowledge of the private key forms the basis of identity in this case. Clearly, it would be feasible to use symmetric encryption to form the basis of identity. However, the disadvantage of using symmetric encryption is that the user would need to share his secret with the trusted device. Further, as a result of the need to share the secret with the user, while symmetric encryption would in principle be sufficient to prove identity to the user, it would insufficient to prove identity to a third party, who could not be entirely sure the verification originated from the trusted device or the user.

In step 610, the trusted device 24 is initialised by writing the certificate 350 into the appropriate non-volatile memory locations 3 of the trusted device 24. This is done, preferably, by secure communication with the trusted device 24 after it is installed in the motherboard 20. The method of writing the certificate to the trusted device 24 is analogous to the method used to initialise smart cards by writing private keys thereto. The secure communications is supported by a 'master key', known only to the TP, that is written to the trusted device (or smart card) during manufacture, and used to enable the writing of data to the trusted device 24; writing of data to the trusted device 24 without knowledge of the master key is not possible.

At some later point during operation of the platform, for example when it is switched on or reset, in step 615, the trusted device 24 acquires and stores the integrity metric 361 of the platform.

When a user wishes to communicate with the platform, in step 620, he creates a nonce, such as a random number, and, in step 625, challenges the trusted device 24 (the operating system of the platform, or an appropriate software application, is arranged to recognise the challenge and pass it to the trusted device 24, typically via a BIOS-type call, in an appropriate fashion). The nonce is used to protect the user from deception caused by replay of old but genuine signatures (called a 'replay attack') by untrustworthy platforms. The process of providing a nonce and verifying the response is an example of the well-known 'challenge/response' process. In addition to including a nonce there is also included a request for CCR's (CCRreq) associated with the platform.

The exact contents of CCRreq will depend on the security policy of the challenging side, as described below. A very strict security policy will require more detailed CCR information as compared to a policy with very low security requirement.

The CCRreq may consist of a combination of

1. CCR indicator (CCR index/CCR content)
2. CCR certificate/specific info about certificate request
3. Update information (Last update/Updated version) request
4. History (Full/Partial) request. This field will have the value for H(Dn−I) or H(Dt−I) or both.

Typically a CCRreq, has at least two of the above two included. One of these is CCR index or any other such field as has been implemented to identify a CCR. The other one is one of the rest in the above list.

The exact number and kind of CCR information that is requested by CCRreq totally depends on the user's security requirement. If a user has a high security specification, this might mean he needs more information to decide how much trust to put on the platform. One such example is a security requirement that requires the total history of CCR and all other information stored in the CCR. In this case the CCRreq will have:

CCR index, certificate, last update, last update version, total history of CCR.

In step 630, the trusted device 24 receives the challenge, including the CCRreq, and creates an appropriate response. This may be a digest of the measured integrity metric and the nonce, and optionally its ID label. Then, in step 635, the trusted device 24 signs the digest, using its private key, and returns the signed digest, accompanied by the certificate 350, to the user where the digest includes the CCR information requested.

In step 640, the user receives the challenge response and verifies the certificate using the well known public key of the TP. The user then, in step 650, extracts the trusted device's 24 public key from the certificate and uses it to decrypt the signed digest from the challenge response. Then, in step 660, the user verifies the nonce inside the challenge response. Next, in step 670, the user compares the computed integrity metric, which it extracts from the challenge response, with the proper platform integrity metric, which it extracts from the certificate. If any of the foregoing verification steps fails, in steps 645, 655, 665 or 675, the whole process ends in step 680 with no further communications taking place.

To allow a user to assign a trust level, from a plurality of trust levels, the user, in addition to comparing the computed integrity metic(s) with the proper platform metric (as described above), adopts a security policy, as described below.

Accordingly, once a successful comparison has been achieved, how a user interprets the CCR information depends on the users security policy. In some cases, it may be required by the challenger to verify the CCR certificate. In other cases it might not. The same CCR information can be interpreted differently by different users having differing security policies.

Figure 8:
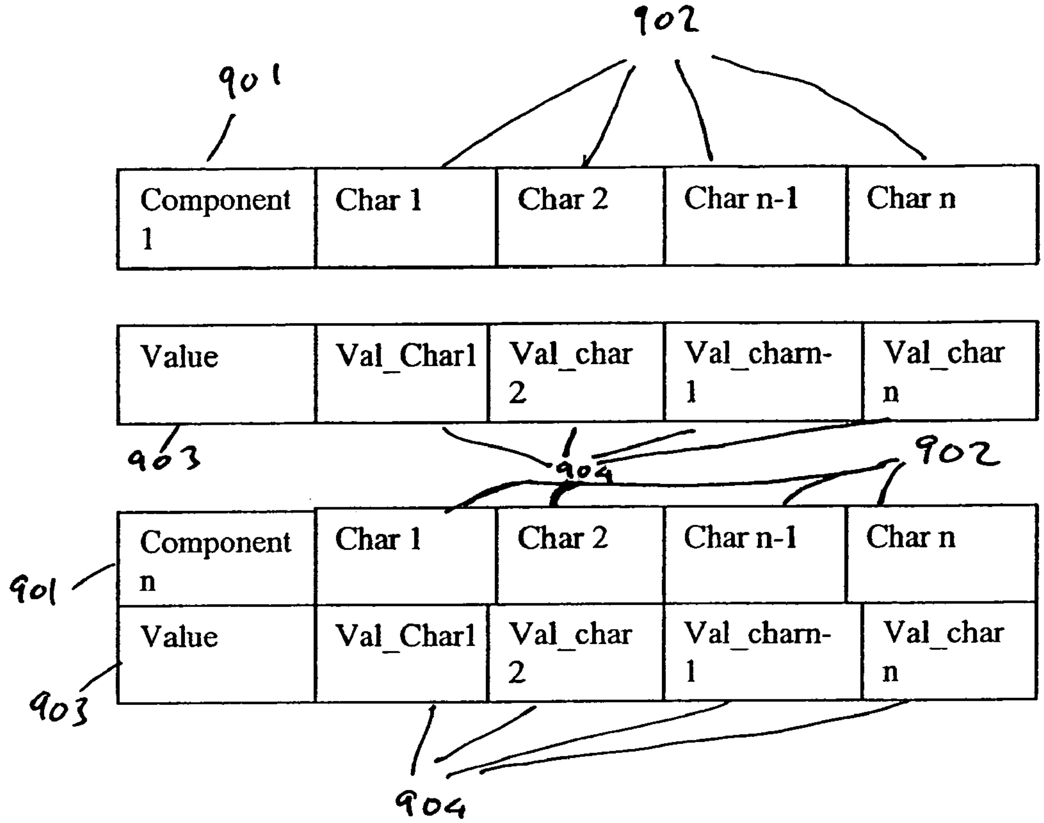
FIG. 8 is a diagram that illustrates the database of characteristics of functional components made by the user.

On receiving the CCV, the user compares whether it meets the criteria set for that particular component. These criteria are the CCR field values obtained from trusted source and stored in a secure storage, for example a trusted party may stipulated that only a software application of a certain version number, or above, can be used. The secured storage is a token like smartcard or is any other tamper proof computing apparatus. FIG. 8 describes the logical structure for storing the values of each field in CCR form once obtained from the trusted source by the user. This list has to be stored in a secure storage structure that cannot be subverted by physical or logical means.

In the FIG. 8 component 901 gives the name of the component and list the various characteristics 902 of the component which will form the various fields in a CCR. The field Value 903 stores the value obtained from the trusted source for each of the component.

Val_Char 904 gives the value for a particular characteristic 902 of the component 901.

This set of criteria forms the core of policy database of the user. Every component will have a number of characteristics with a specific value. For example, if a user wants to use a particular software application, the first thing it does is it obtains all the characteristic values for that software application from the software vendor. It then stores these values in a secure device/application as showed in the FIG. 8.

Then the user, depending on his requirement, decides which of the characteristics of this application is required to be verified to establish a degree of trust. The user can store the list of CCR fields it has to check for each component for each trust level in a secure storage.

Similarly, for hardware components, it can obtain all the relevant values/information from the manufacturer. The user can then decide, based upon a security policy, which of the stored characteristics for this component it needs to verify to establish the degree of trust required.

In this way, a user can build up a database of all the components of a platform that he thinks are necessary to be verified to establish trust.

One integral part of the scheme is to take the decision when will a computing apparatus be assigned a particular trust level. A trust level is assigned to a component of a computing apparatus only when it meets the requirement(s) as stored in the policy by the user. This requires the user to maintain a database of CCR fields to be verified by user to assign trust level to a component. The user can have another table listing the components and parameters to be verified for each trust level. Every characteristic represent a particular filed in the CCR of that component.

Figure 9:
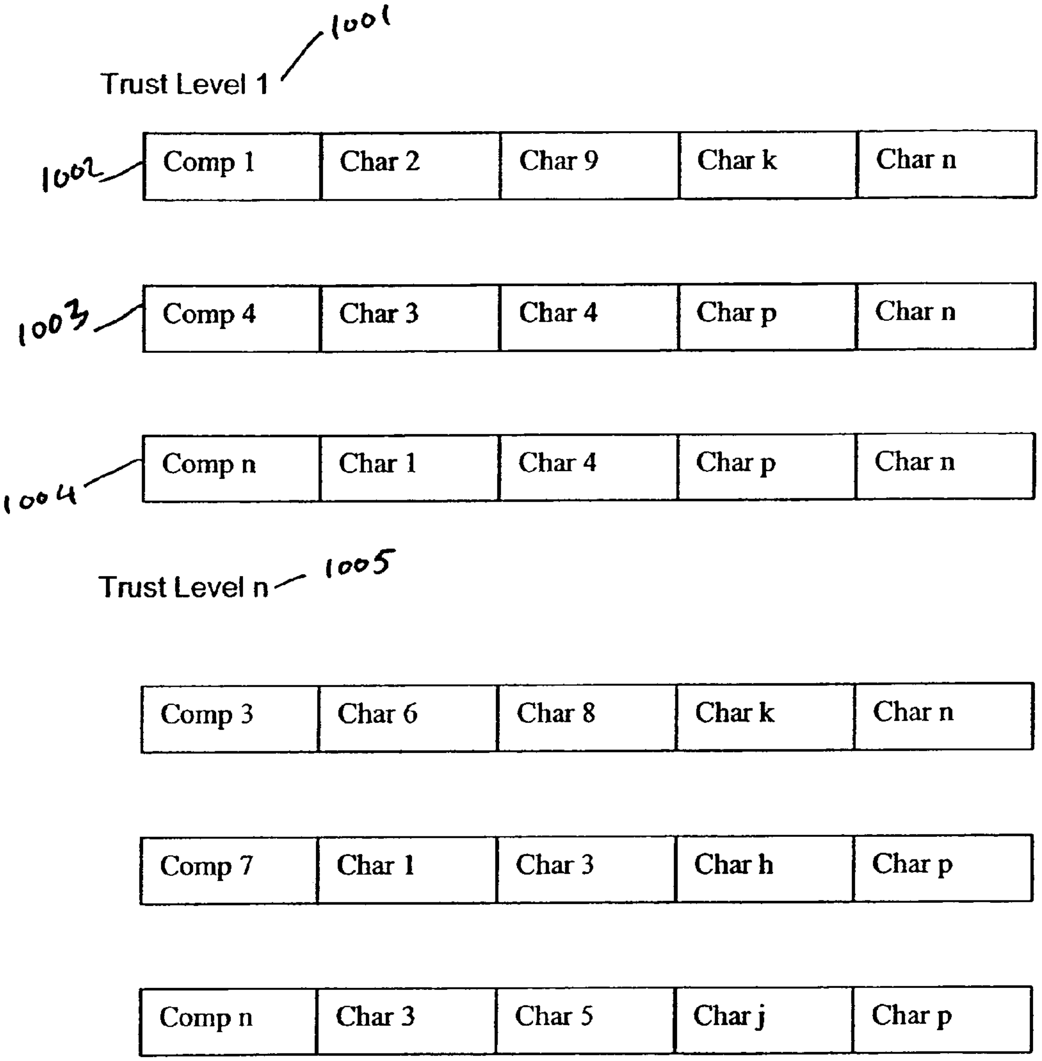
FIG. 9 is a diagram that illustrates the database prepared by a user for parameters to be checked for each trust level.

FIG. 9 illustrates an example of the type of structure that could be used to store component characteristics to be verified for individual trust levels. The idea is to give maximum control to the user. So, depending on the sensitivity of the data to be exchanged, it can control the parameters of a component to be checked to establish trust. For example, before undertaking a financial transaction the user can set the required trust level at a higher level, say Trust Level 1 1001. Then all the components and their characteristics listed under the table of Trust Level 1 1001 have to be verified to establish trust, which in this example are components 1002, 1003 and 1004. For example, this list of components could be all the components within a device or a subset, depending upon a users security policy. Once a trust level has been selected the characteristics of the relevant components are compared with the information provided by the trusted third party, such as software version number.

If, for example, only a lower trust level is required (e.g. trust level N 1005) less or different component characteristics are compared against the information provided by the trusted third party, for example an older version of a software application may be acceptable that for level 1 1001.

These databases define the trust level in terms of components and their characteristics. This way, trust can be defined in terms of measurable characteristics of components, thus removing it from the level of abstract.

As stated above, the security policy information is desirably stored in secure storage, for example a smartcard.

One of way storing the policy database can be using mobile devices with considerable storage capacity. This will then provide the user the flexibility to use any other computing appliance for data exchange, without compromising his security requirement.

Alternatively it can be stored in the computing appliance that is usually used by the user for data exchange.

Assuming all is well, in steps 685 and 690, the user and the trusted platform use other protocols to set up secure communications for other data, where the data from the platform is preferably signed by the trusted device 24.

Further refinements of this verification process are possible. It is desirable that the challenger becomes aware, through the challenge, both of the value of the platform integrity metric and also of the method by which it was obtained. Both these pieces of information are desirable to allow the challenger to make a proper decision about the integrity of the platform. The challenger also has many different options available—it may accept that the integrity metric is recognised as valid in the trusted device 24, or may alternatively only accept that the platform has the relevant level of integrity if the value of the integrity metric is equal to a value held by the challenger (or may hold there to be different levels of trust in these two cases).

The techniques of signing, using certificates, and challenge/response, and using them to prove identity, are well known to those skilled in the art of security and therefore need not be described in any more detail herein.

There exist many available challenge/response mechanisms. The implementation of an authentication protocol used in the present embodiment is mutual (or 3-step) authentication, as described in ISO/IEC 9798-3, "Information technology—Security techniques—Entity authentication mechanisms; Part 3; Entity authentication using a public key algorithm", International Organization for Standardization, November 1993. Of course, there is no reason why other authentication procedures cannot be used, for example 2-step or 4-step, as also described in this reference.

As would be appreciated by a person skilled in the art all the CCV fields in the CCR proposed in this embodiment are optional.

What is claimed:

1. A method for establishing communications with a computer entity, comprising:

requesting a trusted device associated with a computer entity to provide an integrity metric calculated for the entity by the trusted device and containing values indicative of one or more characteristics of the entity;

receiving a response from the trusted device including an integrity metric calculated for the entity by the trusted device;

comparing values in the integrity metric calculated for the entity by the trusted device with authenticated values provided for the entity by a trusted party; and selecting a level of trust for the entity from a plurality of predefined levels of trusts based on at least one value in the integrity metric calculated for the entity by the trusted device.

2. The method of claim 1, wherein the trusted device is hardwired to the computer entity.

3. The method of claim 2, wherein the trusted device is configured to control the boot process of the computer entity.

4. The method of claim 3, wherein the trusted device is configured to not respond to the request for the integrity metric if the boot process of the computer entity was not controlled by the trusted device.

5. The method of claim 2, wherein the trusted device is comprised of a plurality of components hardwired to the computer entity.

6. The method of claim 1, wherein the trusted device is configured to contain one or more of a public encryption key, a private encryption key, and one or more authenticated values provided for the entity integrity metric by the trusted party.

7. The method of claim 6, wherein the trusted device is configured to calculate the integrity metric by generating a digest of BIOS instructions in the BIOS memory of the entity.

8. The method of claim 6, wherein the trusted device is configured to calculate the integrity metric by measuring one or more values of configuration information regarding one or more components of the entity.

9. The method of claim 8, wherein the components of the entity are selected from among the group of components comprising hardware components and software components.

10. The method of claim 9, wherein the components of the entity are selected from among the group of components comprising the BIOS, ROM, operating system loader, and operating system of the entity.

11. The method of claim 9, wherein the configuration information measured for at least one of the components comprises one or more of certificate information, last update information, latest update version information, and previous update information.

12. The method of claim 6, wherein the trusted device is configured to calculate the integrity metric by engaging in predetermined interactions with one or more components of the entity and acquiring the values of the responses of the one or more components.

13. The method of claim 6, wherein the response received from the trusted device includes the authenticated values provided by the trusted party.

14. The method of claim 1, wherein requesting the trusted device for the integrity metric comprises:

generating a nonce to pass to the trusted device with the request.

15. The method of claim 14, wherein the response from the trusted device includes the nonce received with the request.

16. The method of claim 1, further comprising:

initiating data transfer to the entity in accordance with the selected trust level.

17. The method of claim 16, wherein initiating data transfer to the entity in accordance with the selected trust level comprises transferring no data.

18. A method for establishing communications between a computer entity and a user, comprising:

presenting a request from the user to a trusted device associated with a computer entity to provide an integrity metric calculated for the entity by the trusted device and containing values indicative of one or more characteristics of the entity;

presenting to the user a response from the trusted device including an integrity metric calculated for the entity by the trusted device;

comparing at the user values in the integrity metric calculated for the entity by the trusted device with authenticated values provided for the entity by a trusted party; and selecting at the user a level of trust for the entity from a plurality of predefined levels of trusts available to the user based on at least one value in the integrity metric calculated for the entity by the trusted device.

19. The method of claim 18, wherein the trusted device is hardwired to the computer entity.

20. The method of claim 19, wherein the trusted device is configured to control the boot process of the computer entity.

21. The method of claim 20, wherein the trusted device is configured to not respond to the request for the integrity metric if the boot process of the computer entity was not controlled by the trusted device.

22. The method of claim 19, wherein the trusted device is comprised of a plurality of components hardwired to the computer entity.

23. The method of claim 18, further comprising: passing from the trusted party to the trusted device one or more of a public encryption key, a private encryption key, and one or more authenticated values for the entity integrity metric.

24. The method of claim 23, wherein the trusted device is configured to calculate the integrity metric by generating a digest of BIOS instructions in the BIOS memory of the entity.

25. The method of claim 23, wherein the trusted device is configured to calculate the integrity metric by measuring one or more values of configuration information regarding one or more components of the entity.

26. The method of claim 25, wherein the components of the entity are selected from among the group of components comprising hardware components and software components.

27. The method of claim 26, wherein the components of the entity are selected from among the group of components comprising the BIOS, ROM, operating system loader, and operating system of the entity.

28. The method of claim 25, wherein the components of the entity are selected from among the group of components comprising hardware components and software components.

29. The method of claim 26, wherein the configuration information measured for at least one of the components comprises one or more of certificate information, last update information, latest update version information, and previous update information.

30. The method of claim 23, wherein the trusted device is configured to calculate the integrity metric by engaging in predetermined interactions with one or more components of the entity and acquiring the values of the responses of the one or more components.

31. The method of claim 23, wherein the response received from the trusted device includes the authenticated values provided by the trusted party.

32. The method of claim 23, wherein the request includes input data.

33. The method of claim 32, wherein the response includes the input data processed with the private encryption key.

34. The method of claim 18, wherein the request includes a nonce.

35. The method of claim 34, wherein the response includes the nonce received with the request.

36. The method of claim 18, further comprising:

initiating data transfer from the user to the entity in accordance with the selected trust level.

37. The method of claim 36, wherein initiating data transfer from the user to the entity in accordance with the selected trust level comprises transferring no data.

* * * * *